(12) United States Patent
Kubota et al.

(10) Patent No.: US 7,069,094 B2
(45) Date of Patent: Jun. 27, 2006

(54) COMPUTER-AIDED PRODUCT DESIGN SYSTEM

(75) Inventors: Nagomu Kubota, Wako (JP); Hiromi Shimada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 857 days.

(21) Appl. No.: 10/102,708

(22) Filed: Mar. 22, 2002

(65) Prior Publication Data

US 2002/0138238 A1    Sep. 26, 2002

(30) Foreign Application Priority Data

Mar. 23, 2001    (JP)    ............. 2001-086221

(51) Int. Cl.
*G06F 19/00*    (2006.01)
(52) U.S. Cl. .................................................. 700/98
(58) Field of Classification Search ............ 700/98; 703/1
See application file for complete search history.

(56) References Cited

U.S. PATENT DOCUMENTS 5,812,402 A    9/1998  Nishiyama et al. ..... 364/468.03

FOREIGN PATENT DOCUMENTS

| EP | 0475632 | * | 3/1992 |
|---|---|---|---|
| JP | 09-185647 | | 7/1997 |
| JP | 9-319772 | | 12/1997 |
| JP | 11-300756 | * | 11/1999 |
| JP | 11300756 | | 11/1999 |

OTHER PUBLICATIONS

Tokuyama et al., "An Approximate Method for Generating Draft on a Free-Form Surface", The Visual Computer, vol. 15, p. 1-8 (1999).

Dissinger et al., "Geometric Reasoning for Manufacturability Evaluation—Application to Powder Metallurgy", Computer-Aided Design, vol. 28, No. 10, pp. 783-794 (1996).

* cited by examiner

*Primary Examiner*—Leo Picard
*Assistant Examiner*—Ryan Jarrett
(74) *Attorney, Agent, or Firm*—Arent Fox, PLLC.

(57) ABSTRACT

In a product design system having a computer and an interactive program stored in the computer for aiding the engineer to design a product and including product design process for allowing the engineer to design a product model and mold design process to design a mold for producing the product based on the designed product model, the program is rewritten such that a basic element that constitutes the product model is constituted, a fillet is applied on the constructed basic element, and it is judging whether a release draft formed on the constructed basic element with the applied fillet is sufficient for releasing the product from the mold to be designed on the mold design process. With this, since the product model is assigned with the fillet in the initial design stage of the product design process, the engineer can continue designing while confirming or verifying the function of the element based on the product model to which fillet has been applied. Further, this can make the release draft correction operations easier than that in the prior art.

14 Claims, 20 Drawing Sheets

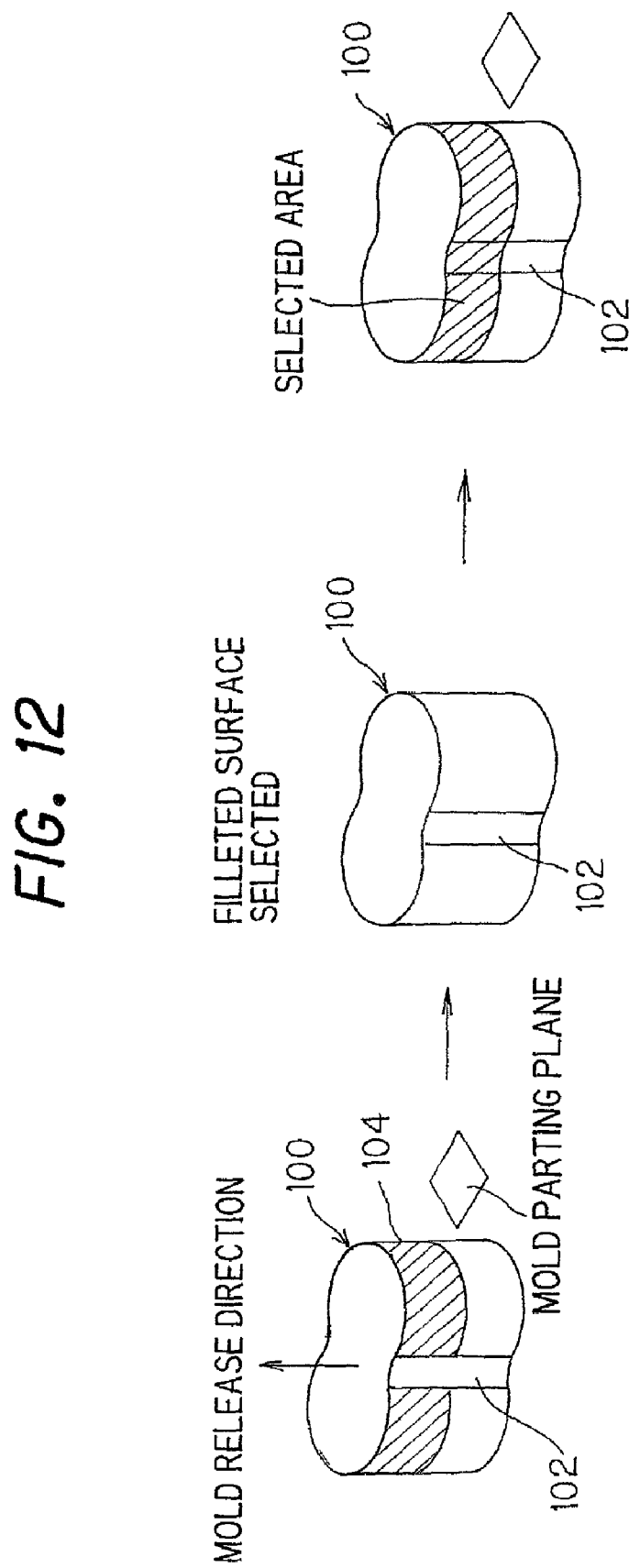

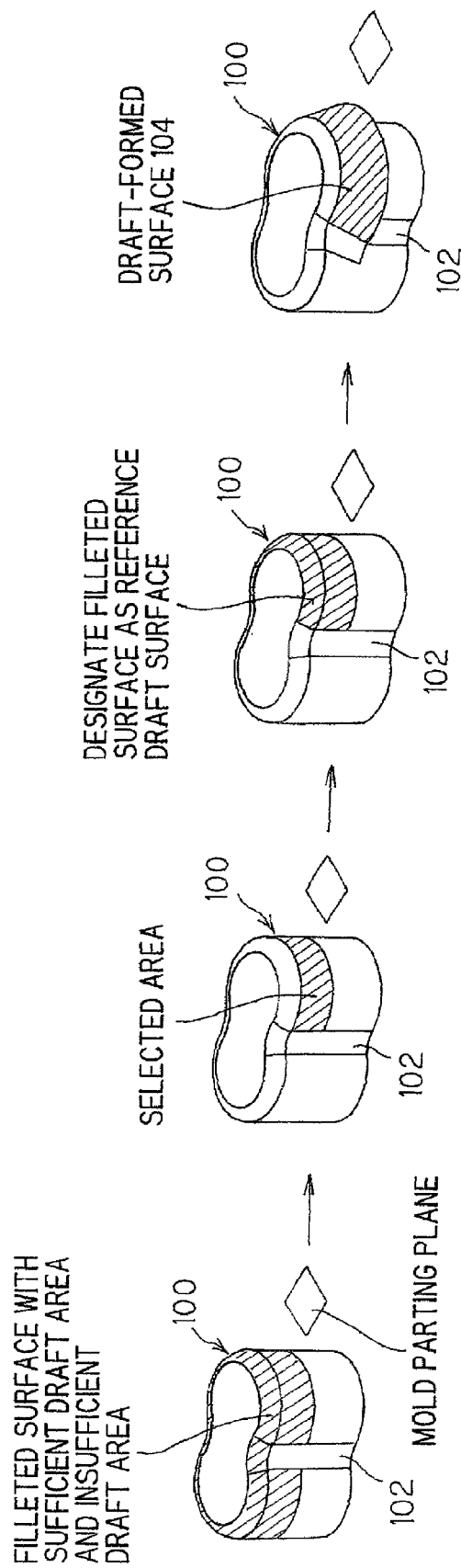

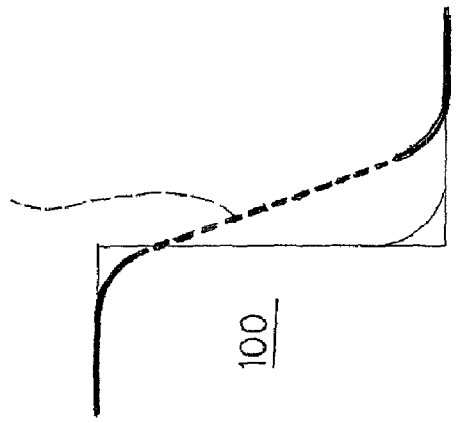
FIG. 14A  MOLD RELEASE DIRECTION
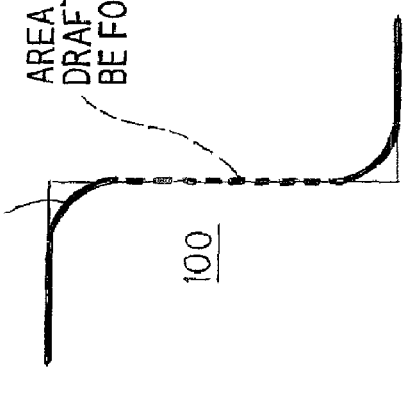
FIG. 14B  FILLETED SURFACE DESIGNATED AS REFERENCE DRAFT SURFACE
AREA WHERE DRAFT IS TO BE FORMED
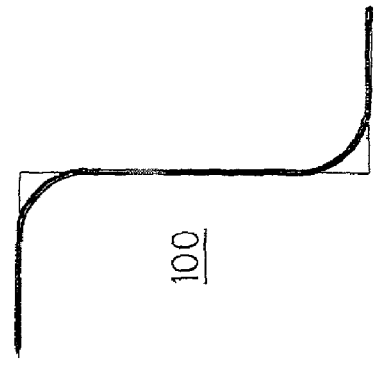
FIG. 14C  DRAFT-FORMED SURFACE TANGENTIALLY CONTINUOUS WITH FILLETED SURFACE

FIG. 20
PRIOR ART
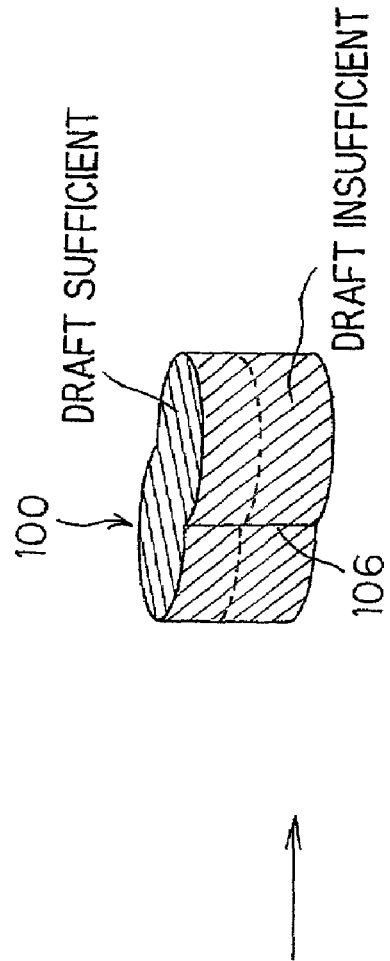
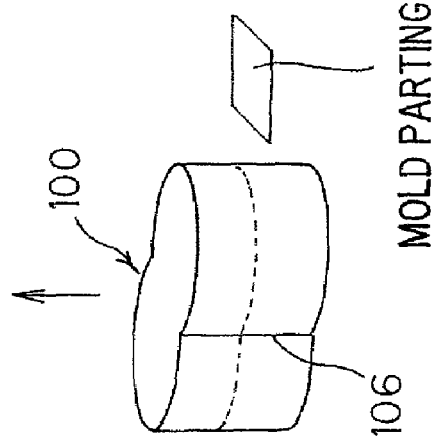

COMPUTER-AIDED PRODUCT DESIGN SYSTEM

BACKGROUND OF THE INVENTION

1. Field of the Invention

This invention relates to a computer-aided product design system, more specifically, a product design system constituted as the so-called CAD (computer-aided design)/CAM (computer-aided manufacturing), CIM (computer-integrated manufacturing) and other product design systems.

2. Description of the Related Art

The technology taught by Japanese Laid-Open Patent Application Hei 9-319,772 can be given as an example of this kind of computer-aided product design system. In this prior-art, the features of the product shape are determined in the preceding product design process, thus facilitating automated design of the upper mold shape in the mold design process in the subsequent process, whereby shortening of the period of time to design in both processes is possible.

In CAD/CAM or CIM, when molds are used to manufacture products, the designer normally uses a CAD system to first make or design a product model or product shape and the product model is then used to make or design a mold model in the mold design process. Next, this mold model is used to make mold fabrication data, after which the mold is fabricated by CNC (computer numerical control) fabrication, etc., using the data, and the fabricated mold is used to make the product by casting or cutting.

In this way, the shape of the product model constructed in the product design process determines the shape of the product, and therefore the release draft, i.e., the release draft for releasing the product from the mold required for the casting process, must be added to the product model in the product design process.

A rounded portion referred to as a fillet is applied or formed on a square edge in this product model. Specifically, the product model is edited such that portions where two lines or curves intersect continue smoothly with a circular arc (fillet) having designated or specified radius of curvature.

In the prior art product design process using CAD/CAM or CIM, first the release draft is formed in the product model, and the fillet is applied or formed. This is because in the prior art product design process, the shape of the model is described, by using an edge often referred to as a winged edge, and by defining the relationship of the edge containing its left and right surfaces and points. If a fillet is applied, the edge disappears. For that reason, the fillet is formed at a relatively later stage. The fillet is added with the intent of improving appearance and in addition to avoiding the concentration of stress in the product (and mold).

However, it is desirable for the engineer (designer) that the fillet be applied in the initial stage of the product design process such that he can do the work while confirming or verifying the function of the product based on the product model or product shape with the fillet applied.

Further, when a product is given a complex shape with continuous uneven portions such as in the transmission case of a vehicle, a release draft must be formed or applied to each uneven portion and judgment must be made as to whether the formed release draft is sufficient to release the product from the mold, after which the operation of applying fillet must be performed. In this case, if the formed release draft is to be changed for some reason, the uneven portions must first be corrected, after which the release draft is corrected, resulting in a tedious operation.

Further, in order to form a release draft or fillet in a partial area of an uneven portion in the prior art product design process using CAD/CAM or CIM, since the entire of the uneven portion should necessarily be selected or designated automatically, the process of selecting a partial area of the uneven portion must be done by designating the mold parting plane, mold release direction, etc. Thus, the prior art product system is not satisfactory in the freedom of design and leaves much to be improved.

SUMMARY OF THE INVENTION

Therefore, an object of this invention is to resolve the problems described above by providing a computer-aided product design system that allows the engineer (designer) to apply the fillet in an initial design stage prior to form the release draft in the product design process such that he can do the work while confirming and verifying the function of the part based on the product model or product shape with the fillet added.

A second object of this invention is to provide a computer-aided product design system that makes operation relatively easy when it becomes necessary to change the release draft that has already been applied.

A third object of this invention is to provide a computer-aided product design system that allows the engineer to apply the fillet or the release draft at a partial area of uneven portions in a simple manner.

In order to achieved these objects, the invention provides a system for designing a product having at least a computer, a display connected to the computer for displaying result of processing of the computer, an input device connected to the computer for allowing an engineer to enter data in accordance with a required specification of the product and an interactive program, stored in the computer, for aiding the engineer to design the product through the display and the input device, the program having a shape modelling function realized by 3-dimensional curves and surfaces and including at least: product design process for allowing the engineer to design a product model by modelling the product through the shape modelling function; and mold design process for allowing the engineer to design a mold for producing the product based on the designed product model; wherein the program of the product design process comprising; basic element constructing means for constructing a basic element that constitutes the product model; fillet applying means for applying a fillet on the constructed basic element; and release draft judging means for judging whether a release draft formed on the constructed basic element with the applied fillet is sufficient for releasing the product from the mold to be designed on the mold design process.

BRIEF DESCRIPTION OF THE DRAWINGS

These and other objects and advantages of the invention will be more apparent from the following description and drawings, in which:

FIG. 12 is a view, similar to a portion of FIG. 9, but showing the operation of the computer-aided product design system according to a third embodiment of the invention;

FIG. 13 is a view, similar to a portion of FIG. 9, but showing the operation of a computer-aided product design system according to a fourth embodiment of the invention;

FIGS. 14A, 14B and 14C are a set of partial cross-sectional views of the element shown in FIG. 13;

FIG. 20 is an explanatory view similarly showing the operation of a product design system of the prior art.

DETAILED DESCRIPTION OF THE PREFERRED EMBODIMENTS

Embodiments of the computer-aided product design system of the invention are described below by referring to the attached drawings.

Figure 1:
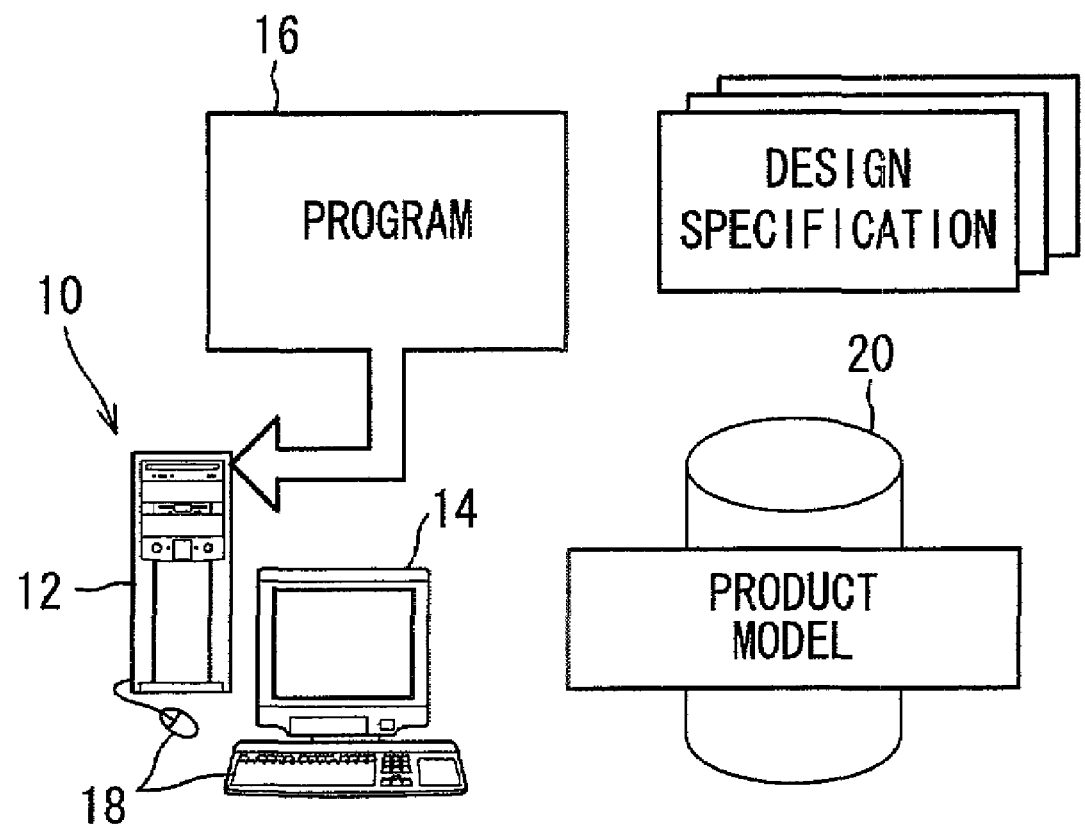
FIG. 1 is a schematic view showing the overall configuration of a computer-aided product design system according to an embodiment of the invention.

FIG. 1 is a schematic diagram showing the overall configuration of a computer-aided product design system according to a first embodiment of the invention. In the figure, reference numeral 10 indicates the product design system which comprises a computer 12, a display 14 connected to the computer 12 for displaying the result of processing and an interactive program 16 (stored in the computer 12) that realizes a shape modeling function by means of 3-dimensional curves and 3-dimensional surfaces via the output displayed on the display 14. Further, the product design system 10 is equipped with a group of input devices including a keyboard, a mouse, etc., and generally assigned with reference numeral 18.

With this, the engineer enters data via the input device 18 based on a design specification that describes the required product (part) specification, whereby the product model is designed interactively by following the instructions stored in the program 16.

The product is expressed in the program 16 as shape vertexes, edges, and other numerical data, and more specifically shape modeling of the product is expressed by means of solid model. Specifically, the engineer sweeps basic shapes (primitives) such as cylinders displayed on the display 14 and conducts Boolean set operations comprising a sum set, a difference set and a product set to design a product model 20. Thus, the product design system is constituted as the CAD/CAM or CIM.

Figure 2:
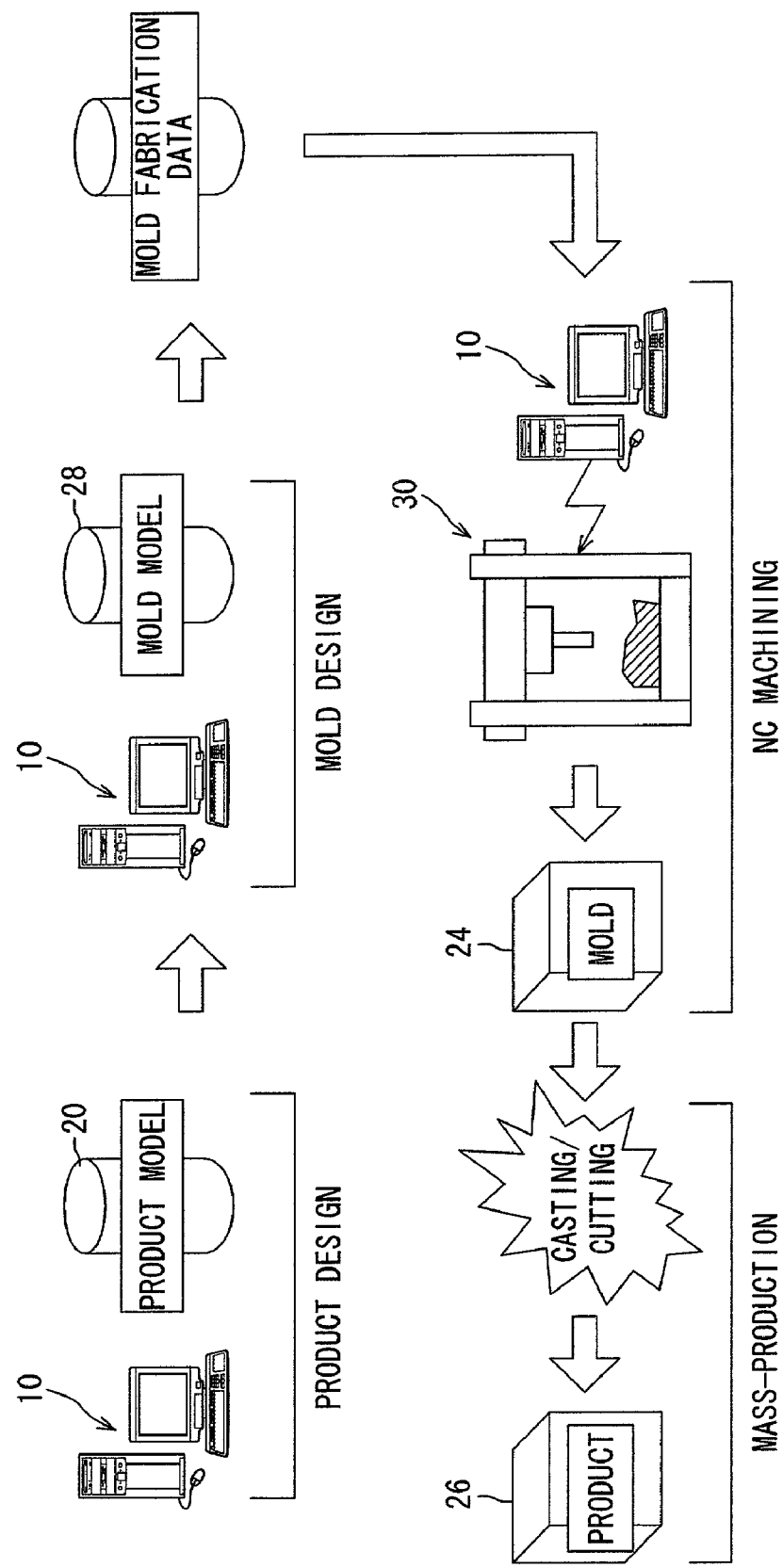
FIG. 2 is an explanatory view showing the process from product design to mass-production performed using the system illustrated in FIG. 1.

FIG. 2 is an explanatory view for explaining the process from product design to mass-production performed using this product design system 10.

As explained above, in CAD/CAM or CIM, when a mold 24 is used to manufacture a product 26, the engineer normally uses this product design system 10 to make or design the product model 20 in the product design process, and the product model 20 is used to make or design a mold model 28 in the mold design process.

Next, the engineer uses the mold model 28 to prepare mold fabrication data which is then used to fabricate the mold 24 by means of an NC machining apparatus 30, etc., and the fabricated mold 24 is used to make the product 26 through casting or cutting (finishing).

Thus, the system 10 has at least the computer 12, the display 14 connected to the computer for displaying result of processing of the computer, the input device 18 connected to the computer for allowing the engineer to enter data in accordance with the required specification of the product and the interactive program 16, stored in the computer, for aiding the engineer to design the product through the display and the input device, which has a shape modelling function realized by 3-dimensional curves and surfaces and including at least the product design process for allowing the engineer to design the product model 20 by modelling the product through the shape modelling function and the mold design process for allowing the engineer to design the mold 24 for producing the product based on the designed product model 20.

In the above, since the shape of the product model prepared in the product design process in this way immediately determines the shape of the product 26, the release draft to be required in the casting process, i.e., the draft to be required to release the product 26 from the mold 24, must be formed or added to the product model in the product design process.

Figure 3:
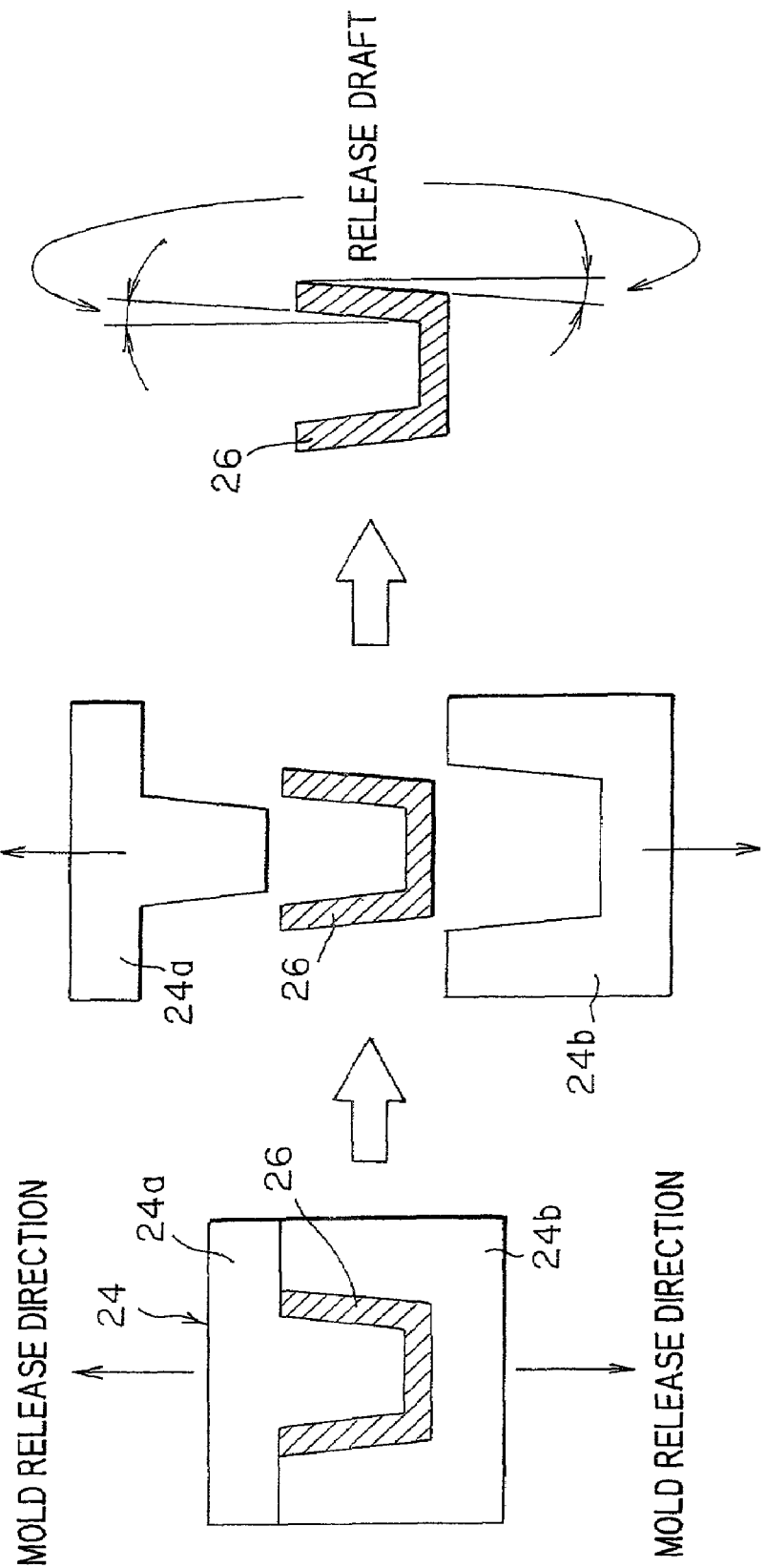
FIG. 3 is an explanatory view showing the product being released from the mold illustrated in FIG. 2.
Figure 4:
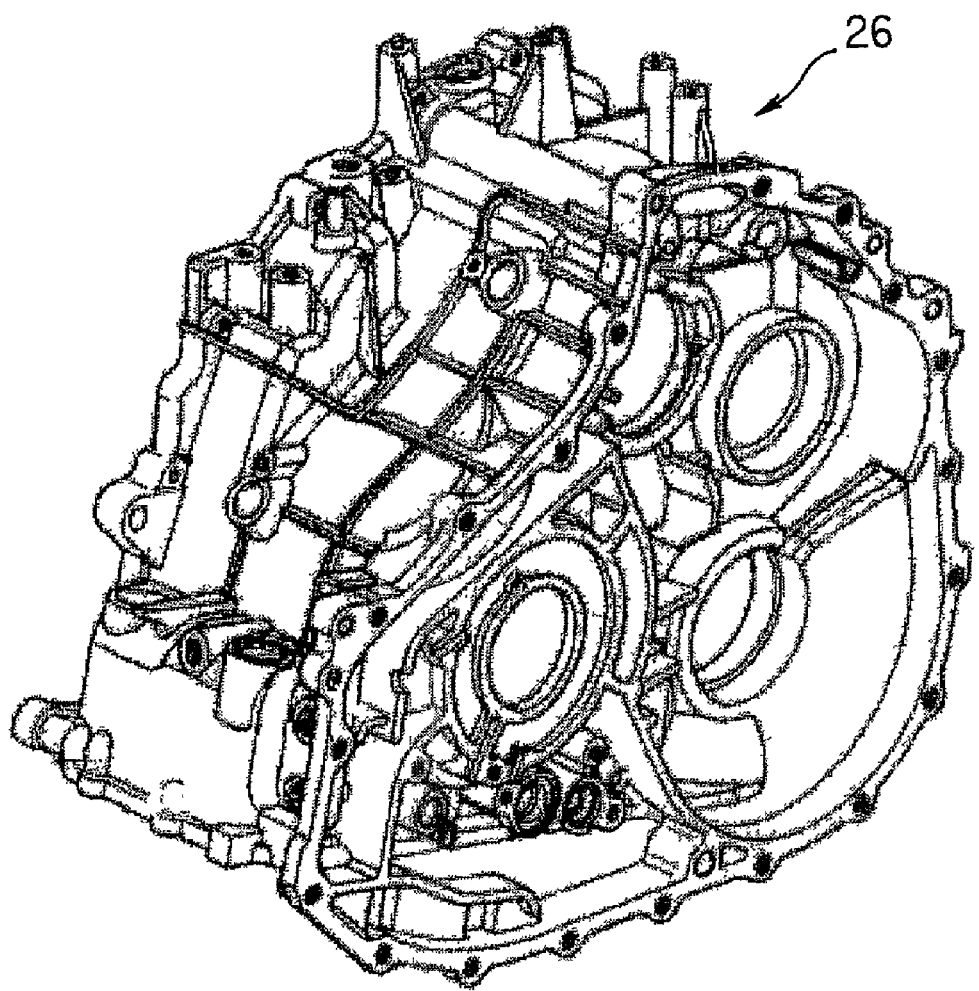
FIG. 4 is a perspective view showing a specific example of a product that the product design system illustrated in FIG. 1 is applied.

FIG. 3 is an explanatory view showing the mold release. Material is flowed in the space prescribed by an upper part (core) 24a and a lower part (cavity) 24b of the mold 24 to make the target product 26. In order to make it easier to release the product 26 from the mold at this time, the release draft should thus be formed. FIG. 3 shows a simplified product, however, the product 26 is actually given a complex uneven shape like that shown in FIG. 4. In the case of the example shown in FIG. 4, the product is a transmission case of a vehicle. In this case the mold shape becomes complex and the number of mold release directions is increased.

Figure 5:
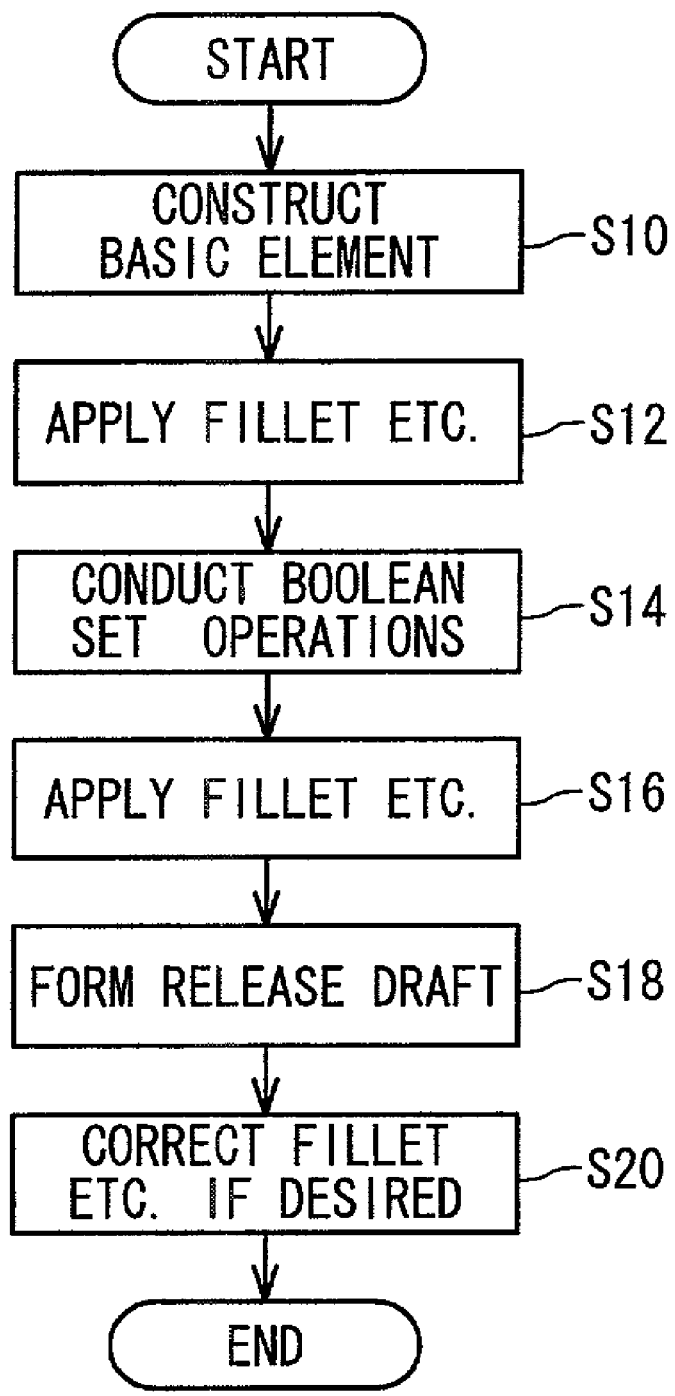
FIG. 5 is a flow chart showing the operation of the product design system illustrated in FIG. 1.

FIG. 5 is a flow chart showing the operation of the computer-aided product design system 10 according to the embodiment of the invention.

As explained below, in S10 the basic element is construct or designed. "Basic element" refers, for example, to one or multiple uneven portions in the transmission case illustrated in FIG. 4, for example. Next, in S12, the fillet, etc., is applied, i.e., filleting, smoothing, trimming, etc., are performed and in S14, the aforesaid Boolean set operations are conducted. Next in S16, the fillet, etc., is again applied to the calculated shape (basic element) and then in S18, the release draft is formed.

The processing in S18 also includes the operation that judges whether or not the formed release draft is sufficient to release the product 26 (more accurately the product model 20). Next, in S20, minimum correction of fillet, etc., for example, is performed as required.

Figure 17:
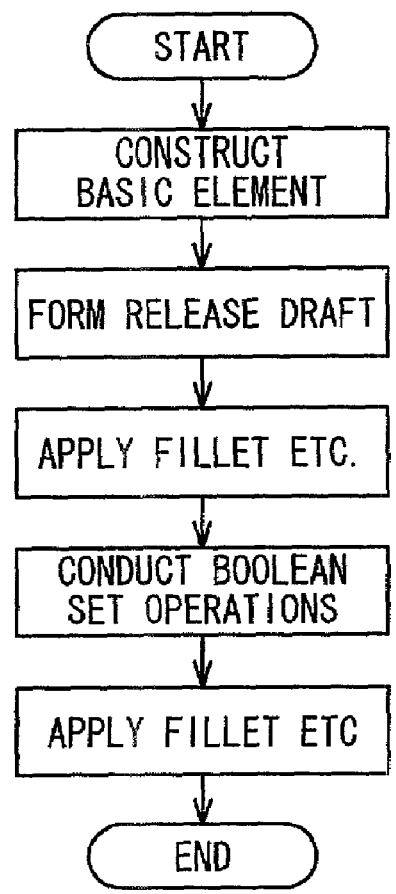
FIG. 17 is a flow chart showing the operation of a product design system of the prior art.

FIG. 17 is a flow chart showing the processing of the prior art. In the prior art, as shown in the flow chart, the release draft is formed after constructing the basic element, after which fillet, etc., is applied.

However, as discussed above, it is desirable for the engineer to apply fillet to the product model 20 in the initial stage of the product design process and to carry out the design by confirming or verifying the function or purpose of the product based on the product model 20 with fillet applied. Moreover, when the release draft is formed first but should then be changed for some reason, the uneven portion (basic element) must first be corrected and then the release draft must be corrected, resulting in a tedious operation. Therefore, this embodiment is configured such that the fillet, etc., is applied, first.

Figure 6:
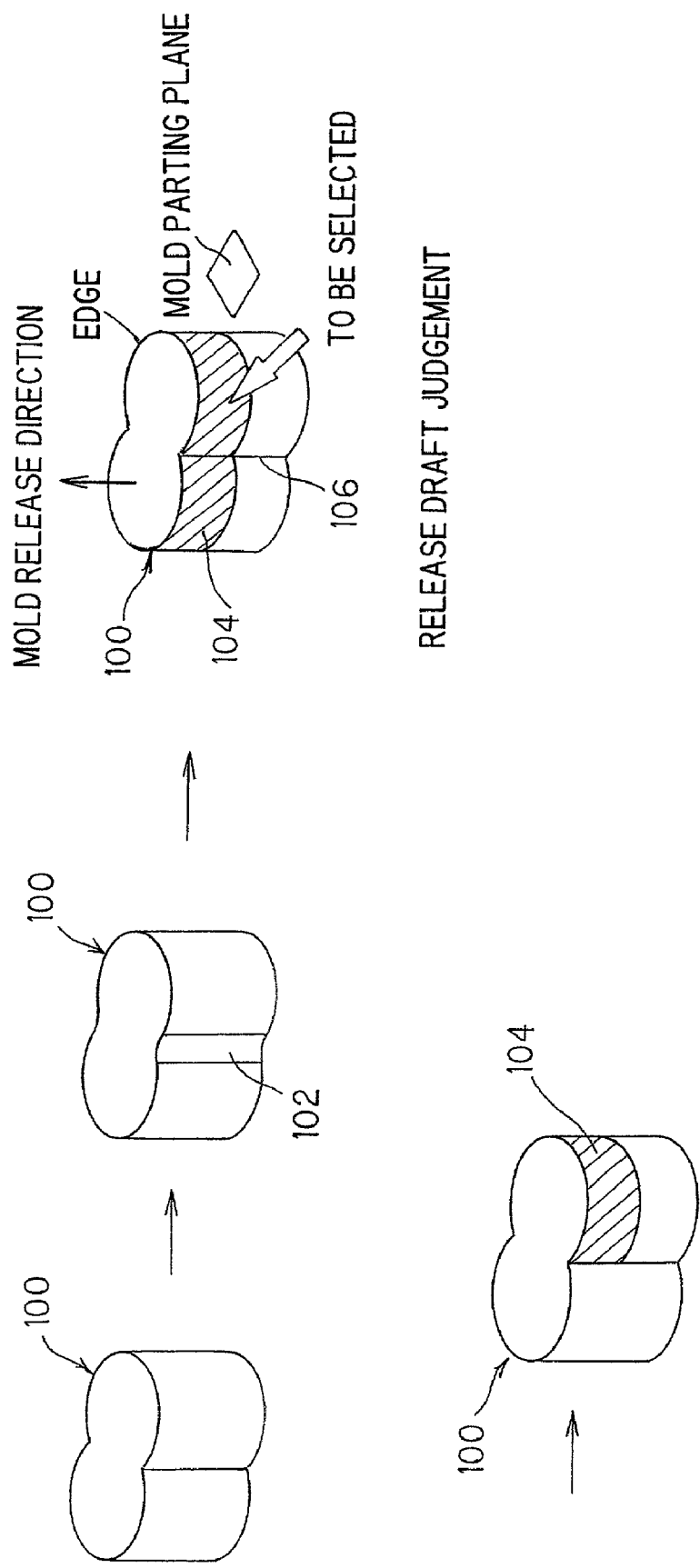
FIG. 6 is an explanatory view showing the specific operation of the product design system illustrated in FIG. 1 and explained in the flow chart in FIG. 5.

The processing in FIG. 5 is explained by referring to FIG. 6.

As shown in the upper left of the same figure, first a basic element (comprising a solid model) 100 of the product model 20 is constructed by combining two cylinders (primitives), and then a fillet 102 is applied or formed at a location where the surfaces mate on the side of the basic element 100. For the sake of simplifying the description, the smoothing and trimming operations are not shown. Next, a release draft is formed on an area shown by the hatched portion and is assigned with reference numeral 104. Then it is judged whether the draft-formed surface 104 is sufficient, more precisely, the release draft on the surface 104 is sufficient for releasing the product from the mold model.

It should be noted that, in forming the release draft and performing the judgment processing, the engineer need only designate or specify the location where the release draft is to be formed (specifically, where the release draft is to be formed, the direction in which the product is to be released and the angle of release draft) and the location where the judgment is to be performed, and the remainder of the processing is performed automatically by the computer 12 according to the instructions already described (programmed) in the program 16. The same is true when applying the fillet 102 in which the engineer need only designate or specify the location and the radius of curvature, after which the computer 12 conducts the filleting operation itself automatically. The same is true with Boolean set operations.

As mentioned above, if the fillet 102 is applied first, then an edge 106 will be lost. Automatic processing by the program 16 assumes the shape expression based on the edge, and therefore automatic processing of the release draft judgment, etc., becomes impossible. Therefore, it becomes necessary for the engineer to designate or specify judgment locations, etc., via the input device 18, which makes processing tedious.

In view of the above, this embodiment is configured such that the fillet 102, once applied, is temporarily removed when designating or specifying the location (where the release draft, etc., is to be formed and where the judgment is to be made). Specifically, the program 16 is rewritten (reprogrammed) to execute such that the fillet is temporarily removed to allow the computer 12 to perform the necessary processing automatically.

Figure 7:
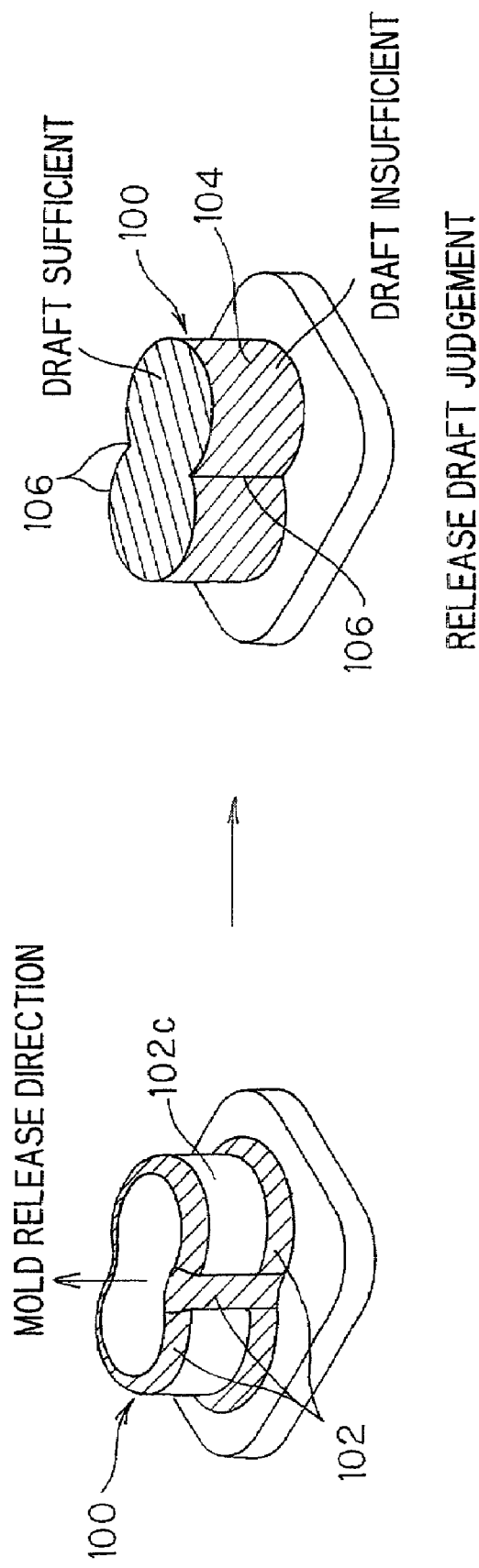
FIG. 7 is an explanatory view similarly showing the specific operation of the product design system illustrated in FIG. 1 and explained in the flow chart in FIG. 5.

In other words, as shown in FIG. 6 and FIG. 7, after the fillet 102 is applied, the fillet 102 is then temporarily removed to restore the edge 106, and the release draft is formed and judgement is made on the draft-formed surface 104 as to whether the draft is sufficient or not. For example, in FIG. 7, it is judged that the draft of the side (indicated by reference numeral 102*c*) is insufficient. After the formed release draft is judged to be sufficient, the fillet 102 is restored again.

With this, since the product model 20 is assigned with the fillet 102 in the initial design stage of the product design process, the engineer can do designing while confirming or verifying the function of the element 100 based on the product model 20 to which fillet 102 has been applied. Further, this can make the release draft correction operations easier than that in the prior art.

Figure 8:
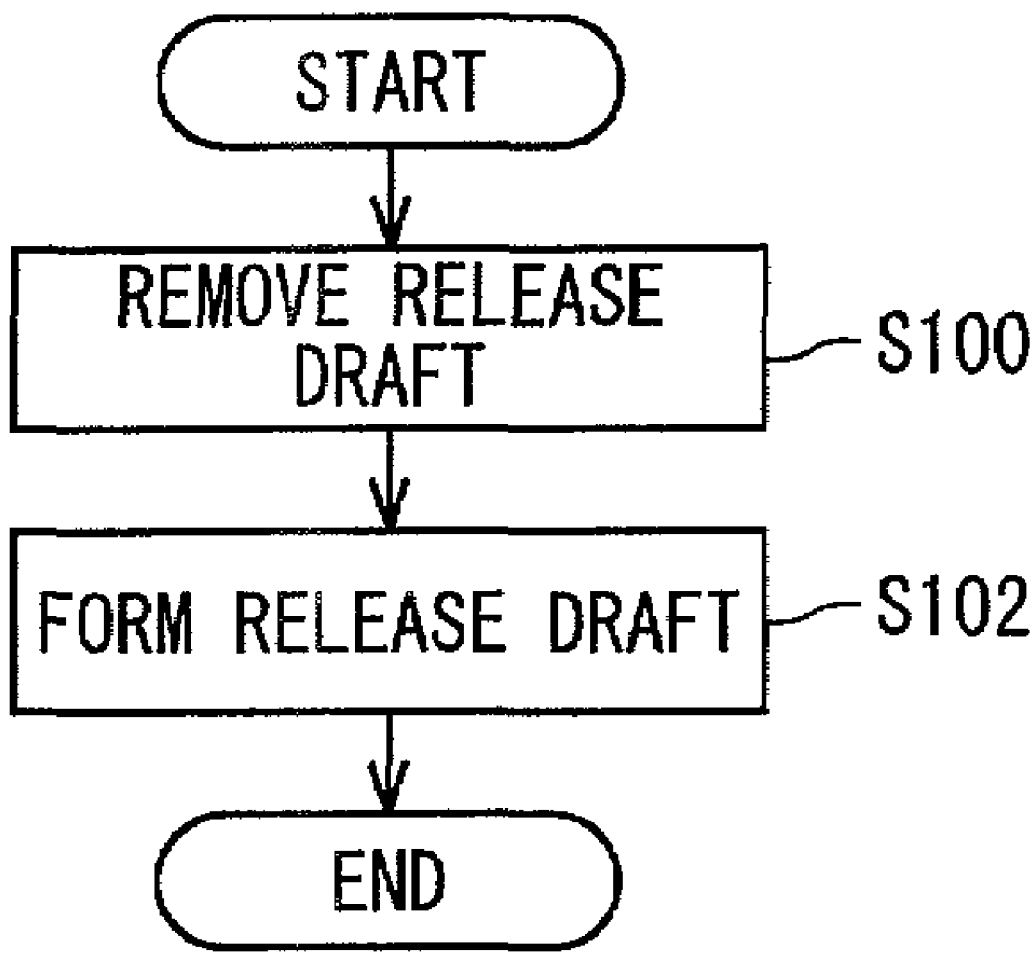
FIG. 8 is a flow chart showing a processing when the release draft is to be changed.
Figure 18:
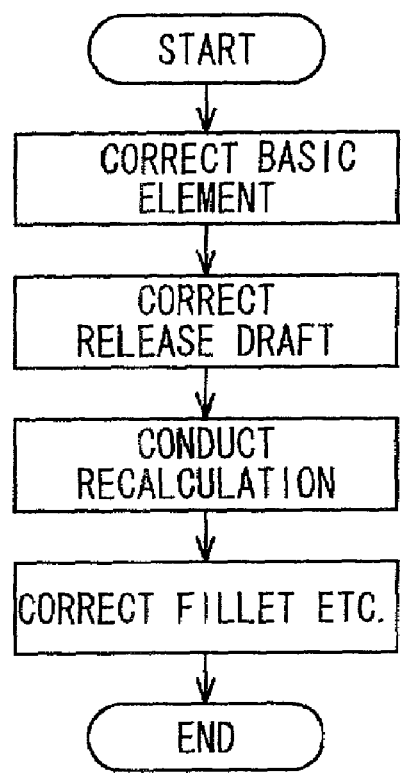
FIG. 18 is a flow chart showing the processing when the release draft is to be changed.

FIG. 8 is a flow chart showing the release draft correction operation in this embodiment, and FIG. 18 is a flow chart showing similar operation in the prior art.

In the prior art operation, as shown in FIG. 18, the basic element is corrected, the release draft is then corrected, and then calculations are performed again, i.e., Boolean set operations must be repeated and the fillet, etc., must be corrected, resulting in a complex operation. It is particularly troublesome, since the parameters must be reset for the Boolean set operations.

In the processing of the system in this embodiment, the release draft is removed in S100 as shown in FIG. 8, and then the release draft is formed newly in S102, thus simplifying the operation.

Further, one characteristic feature of the system in this embodiment is that it becomes possible to designate or specify a partial area of the element by the mold parting planes, etc. In other words, the program 16 is rewritten (reprogrammed) to allow designation or specification of a partial area of the element by the mold parting planes, etc.

Figure 19:
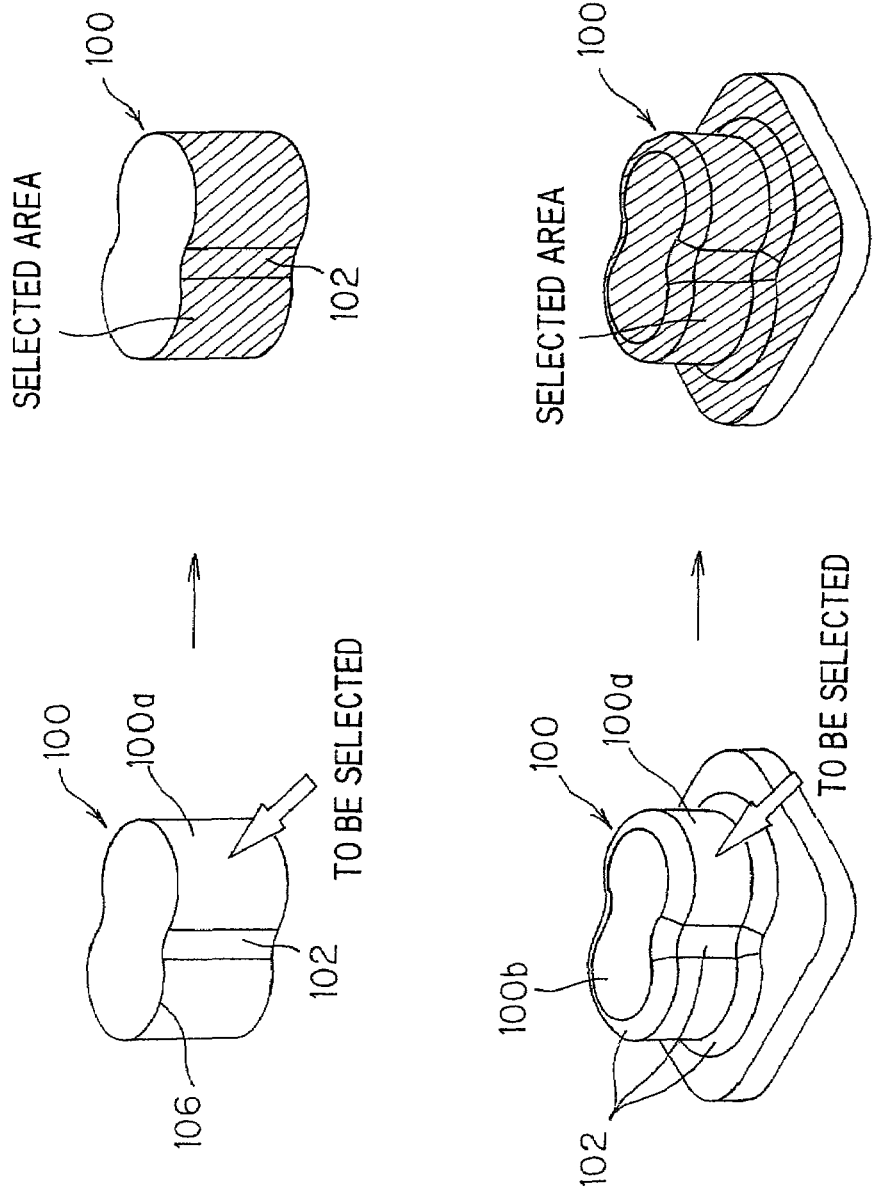
FIG. 19 is an explanatory view showing the operation of a product design system of the prior art.

To be more specific, in the prior art processing, when a side surface 100*a* of the element 100 (on which the fillet 102 has been applied) is to be designated or specified, the entire side surface 100*a*, including the surface on which the fillet 102 has been applied and continuously tangent by the fillet 102, must be selected as shown by the hatched portion in the upper part of FIG. 19, since the shape is expressed by the edge 106 and the side is made continuously tangent by the fillet 102.

Further, in the prior art processing, as shown in the lower part of the figure, when the fillet 102 is applied between the side surface 100*a* and a top end 100*b*, the edge 106 is disappeared or lost by the application of the fillet 102. As a result, the entire element 100 must be selected as shown by the hatched portion in the bottom right of the figure.

Further, in the prior art processing, as shown in FIG. 20, it is impossible to select a partial area by the mold parting plane, etc., thus causing the entire element to be subjected to the automatic processing of the computer 12, as shown by the hatched portion in the figure. Therefore, in order to select a partial area by the mold parting planes, mold release directions, etc., tedious operation to designate or specify the area had to be performed.

Figure 9:
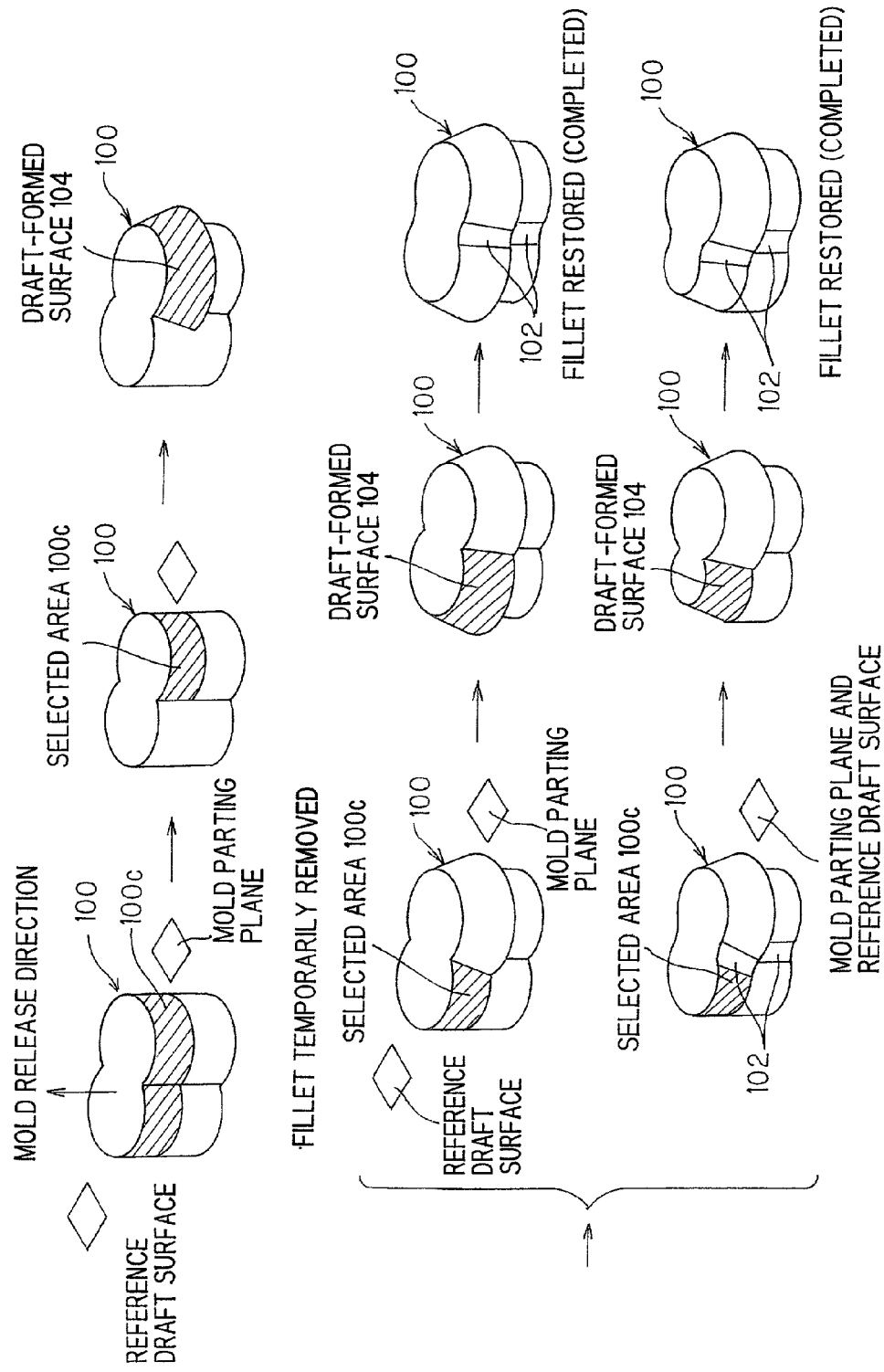
FIG. 9 is an explanatory view similarly showing the specific operation of the product design system illustrated in FIG. 1 and explained in the flow chart in FIG. 5.

In view of this, in this embodiment, as shown in FIG. 9, it is made simpler by designating or specifying a partial area (e.g., an upper half 100*c* of the side surface 100*a* in the figure) of the element 100 by the mold parting plane and mold release direction. In other words, the program 16 is rewritten (reprogrammed) to allow the designation of a partial area by the mold parting plane and mold release direction such that the computer 12 performs the processing automatically.

Further, another characteristic feature of this system in the embodiment is that it becomes possible to set a reference draft surface or plane at any location such that the release draft is formed based on the set reference draft surface. In other words, the program 16 is rewritten (reprogrammed) to allow the setting of the reference draft surface at any location to form the release draft based on the set reference draft surface such that the computer 12 performs the processing automatically. Here, the term "reference draft surface" indicates a base point for the release draft and is a surface whose shape does not change after the release draft is formed.

Figure 10A:
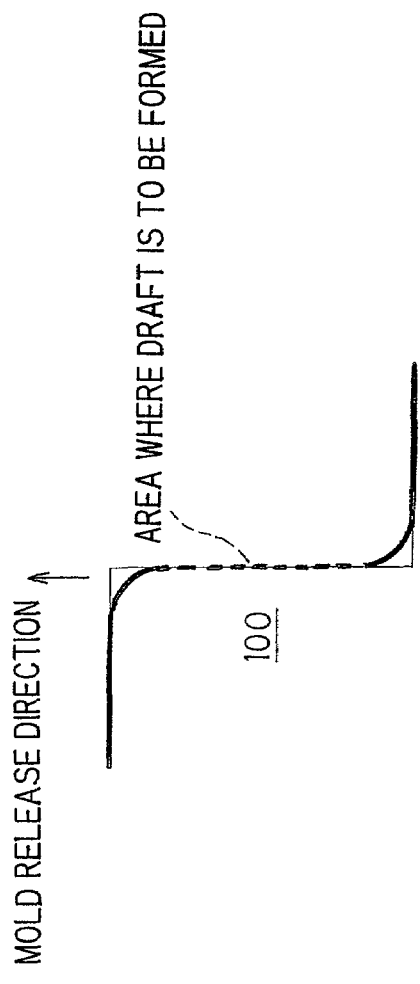
FIGS. 10A, 10B and 10C are a set of partial cross-sectional views of the element shown in FIG. 9.
Figure 10C:
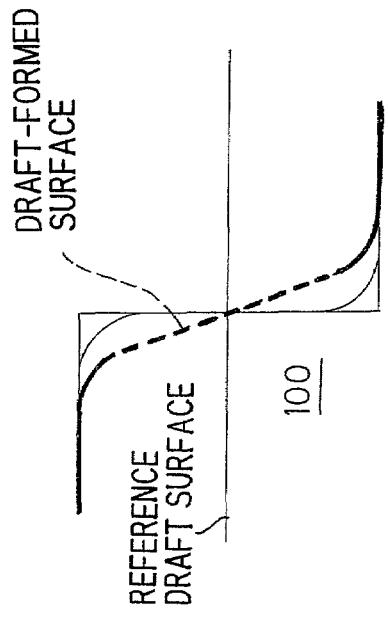
Figure 10B:
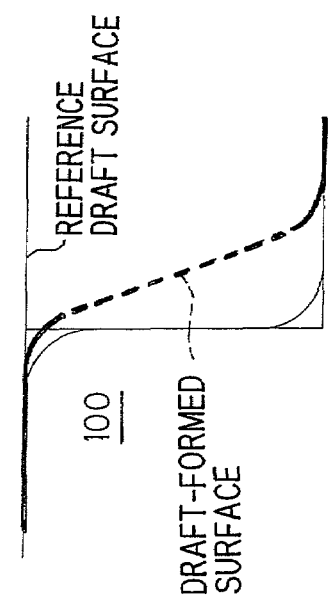

FIGS. 10A, 10B and 10C are a set of partial cross-sectional views of the element 100. As shown in the figures, the reference draft surface can be set or designated at any location. FIG. 10A indicates the area where the draft is to be formed, and FIGS. 10B and 10C illustrate draft-formed surfaces applied based on the set reference draft surface.

It should be noted here that, in FIG. 9, when the draft is formed and then judged to be sufficient, the fillet 102 is restored as explained above. This fillet 102 has a definite or constant curvature radius.

As described above, the computer-aided product design system according to the first embodiment is configured such that the fillet 102, once applied, is temporarily removed to form the release draft and then the temporarily removed fillet 102 is again restored. With this, the engineer can do the design while confirming or verifying the function of the product 26 based on the product model 20 with fillet 102 applied. Further, this can make the operation relatively easy even when the applied release draft is to be changed for some reason.

Further, since this configuration also makes it possible to designate or specify a partial area of the element 100 by the mold parting plane and mold release direction of the mold 24 such that the release draft is formed in the designated area, in addition to the advantages mentioned above, the freedom of design can be improved.

Figure 11:
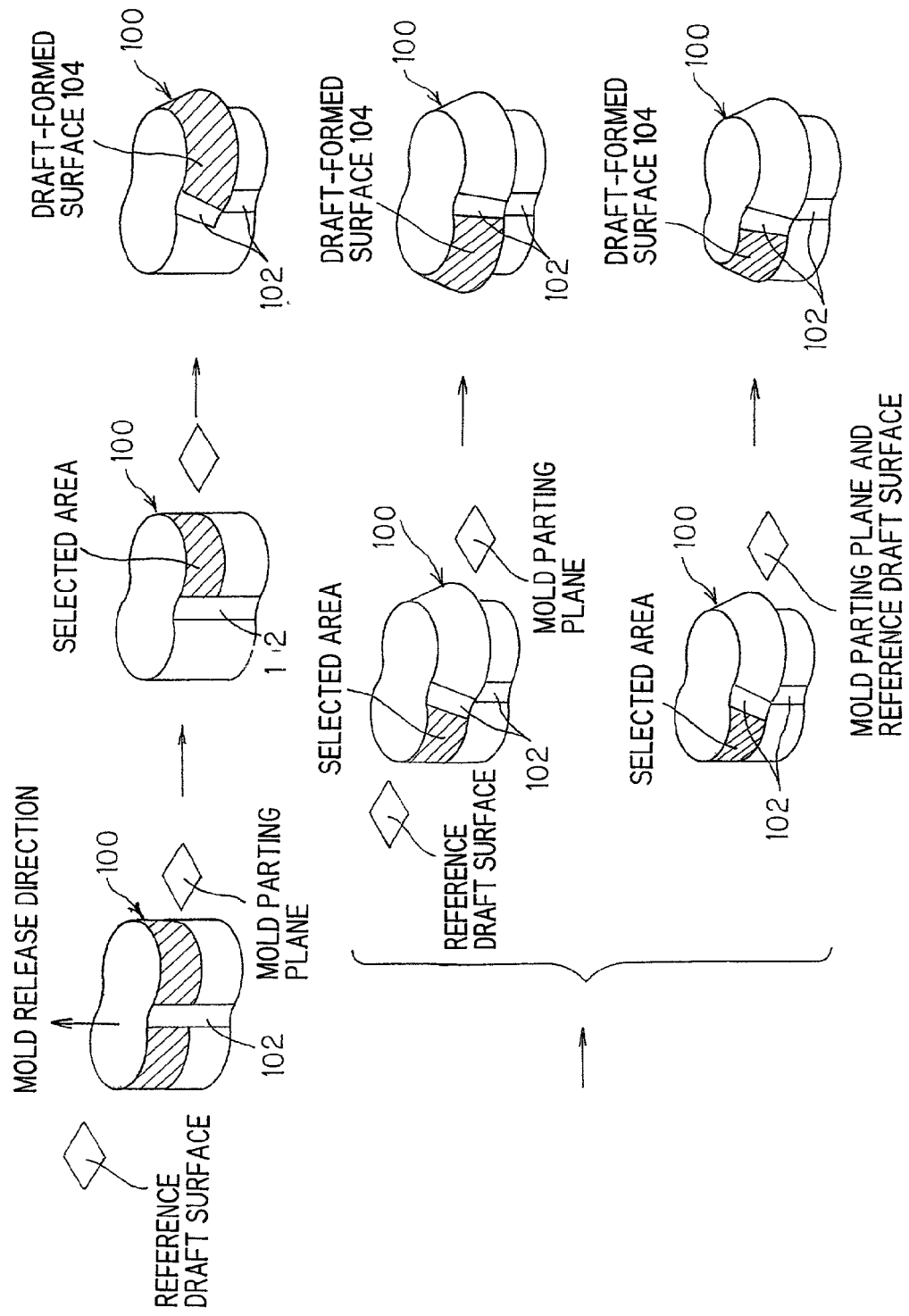
FIG. 11 is a view, similar to a portion of FIG. 9, but showing the operation of a computer-aided product design system according to a second embodiment of the invention.

FIG. 11 is a view, similar to a portion of FIG. 9, but showing the operation of the computer-aided product design system according to a second embodiment of the invention.

In the system in the second embodiment, the filleted surface (the surface on which the fillet 102 is applied) is ignored when the release draft is formed and the draft judgment is conducted on the draft-formed surface 104. The fillet 102 is applied automatically to the surface after the draft has been formed. The remainder of the configuration is the same as that of the first embodiment.

The computer-aided product design system according to the second embodiment is configured such that the release draft is formed during which the fillet 102 is ignored and then the fillet 102 is again applied. With this, the engineer can do the design while confirming or verifying the function of the product 26 based on the product model 20 with fillet 102 applied. In addition, this can make the operation relatively easy even when the formed release draft is to be changed.

FIG. 12 is a view, similar to a portion of FIG. 9, but showing the operation of the computer-aided product design system according to a third embodiment of the invention.

In the system of the third embodiment, the surface on which the fillet 102 has been applied can be selected as an area for formation of the release draft. However, since by applying the fillet 102, the edge 106 has been disappeared or lost from the side surface, when the fillet-formed (filleted) surface is selected, the side surface including the fillet-applied surface around the element must be selected, as illustrated by the hatched portion in the figure.

The rest of the configuration and advantages of the system according to the third embodiment are the same as those of the first embodiment.

FIG. 13 is a view, similar to a portion of FIG. 9, but showing the operation of the computer-aided product design system according to a fourth embodiment of the invention.

In the system of the fourth embodiment, the surface on which fillet 102 has been applied can be selected as the reference draft surfaces. In other words, the program 16 is rewritten (reprogrammed) to allow the use of surfaces on which fillet 102 has been applied as the reference draft surface such that the computer 12 performs the processing automatically.

FIGS. 14A, 14B and 14C are a set of partial cross-sectional views of the element 100 which show the resulting draft surface formed tangentially continuous with the fillet 102. With this, it becomes possible to form the draft surface that is tangentially continuous with the fillet 102 automatically. The remainder of the configuration of the system in the fourth embodiment is the same as that of the first embodiment. The system according to the fourth embodiment can therefore enhance the freedom of design in addition to the advantages of the systems in the foregoing embodiments.

Figure 15:
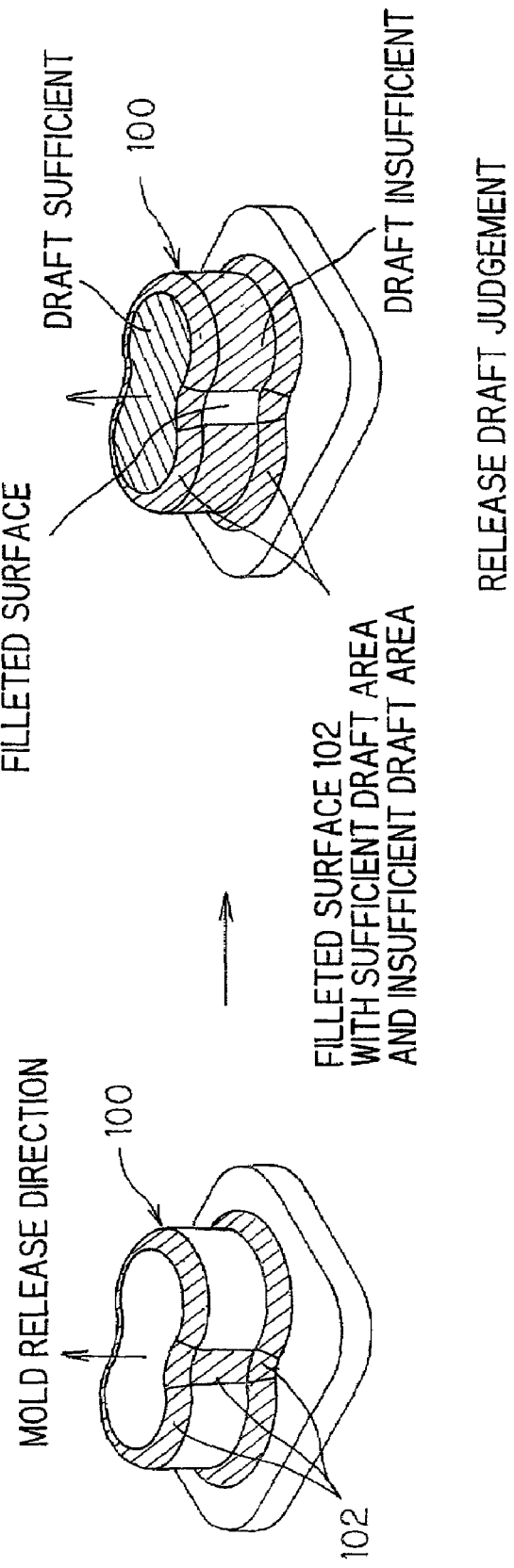
FIG. 15 is a view, similar to a portion of FIG. 9, but showing the operation of a computer-aided product design system according to a fifth embodiment of the invention.

FIG. 15 is a view, similar to a portion of FIG. 9, but showing the operation of system according to a fifth embodiment of the invention.

In the system according to the fifth embodiment, the draft judgment can be conducted via the mold parting plane, mold release direction and the angle of release draft including the surface on which fillet 102 has been applied. The system according to the fifth embodiment is a modification of those of the third embodiment and the fourth embodiment and can therefore has the same advantages as those of the embodiments. The rest of the configuration is the same as that of the first embodiment.

Figure 16:
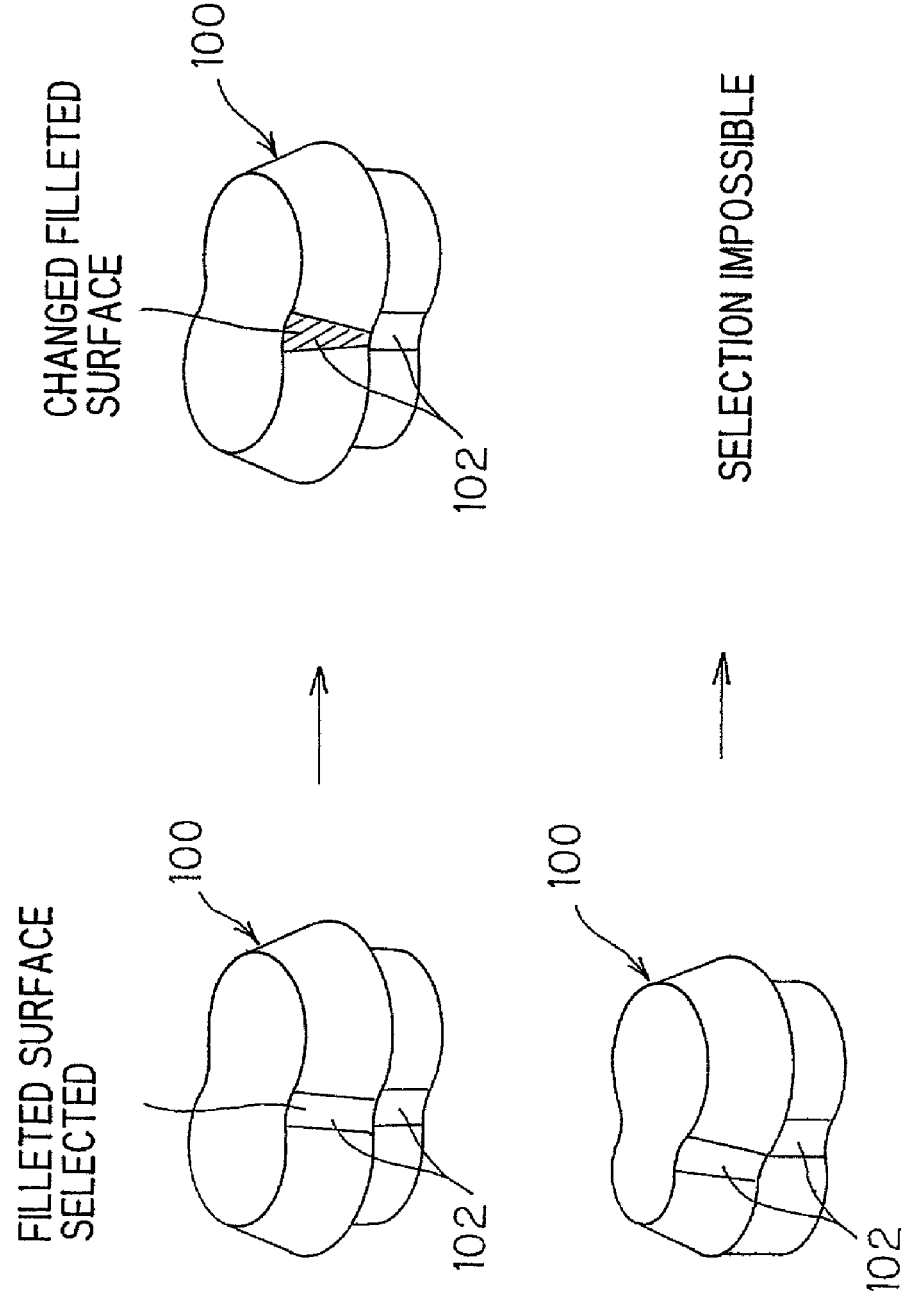
FIG. 16 is a view, similar to a portion of FIG. 9, but showing the operation of a computer-aided product design system according to a sixth embodiment of the invention.

FIG. 16 is a view, similar to a portion of FIG. 9, but showing the operation of a system according to a sixth embodiment of the invention.

In the system of the sixth embodiment, the fillet 102 is a gradually-changing fillet with an indefinite radius of curvature. In other words, the program 16 is rewritten (reprogrammed) to allow the fillet 102 with a definite or constant radius of curvature as shown in the top left of the figure to be changed to the fillet 102 with an indefinite radius of curvature like that shown in the top right of the figure such that the computer 12 performs the processing automatically.

Since the system according to the sixth embodiment is configured as described above, in addition to the advantages of the foregoing embodiments, it can automatically apply any fillet 102 whose radius of curvature is gradually changed as desired, whereby enabling to enhance the freedom of design.

The first to sixth embodiments are thus configured to have a system (10) for designing a product (26) having at least a computer (12), a display (14) connected to the computer for displaying result of processing of the computer, an input device (18) connected to the computer for allowing an engineer to enter data in accordance with a required specification of the product and an interactive program (16), stored in the computer, for aiding the engineer to design the product through the display and the input device, the program having a shape modelling function realized by 3-dimensional curves and surfaces and including at least: product design process for allowing the engineer to design a product model (20) by modelling the product through the shape modelling function; and mold design process for allowing the engineer to design a mold (24) for producing the product based on the designed product model (20); wherein the program (16) of the product design process comprising; basic element constructing means (S10) for constructing a basic element (100) that constitutes the product model (20); fillet applying means (S12) for applying a fillet (102) on the constructed basic element; and release draft judging means (S18) for judging whether a release draft formed on the constructed basic element with the applied fillet is sufficient for releasing the product (26) from the mold (24) to be designed on the mold design process. With this, the engineer can do the work while confirming or verifying the function of the product based on the product model with the fillet applied and in addition, the operation is relatively easy when the applied release draft is to be changed for some reason.

In the system, the release draft judging means includes; release draft forming means (S18) for forming the release draft on the constructed basic element. With this, the engineer can do the work while confirming or verifying the function of the product based on the product model with the fillet applied and in addition, the operation is relatively easy when the applied release draft is to be changed for some reason.

In the system, the release draft forming means removes the fillet (102) during the release draft is being formed, and restores the fillet (102) after the release draft has been formed. With this, the engineer can do the work while confirming or verifying the function of the product based on the product model with the fillet applied and in addition, the operation is relatively easy when the applied release draft is to be changed for some reason.

In the system, the release draft forming means designates an area of the constructed basic element by a parting plane of the mold (24) and a direction of release of the product from the mold (24), and forms the release draft at the designated area. With this, in addition to the advantages mentioned above, the freedom of design can be improved.

In the system, the release draft forming means forms the release draft an area other than a surface where the fillet (102) is applied, and applies the fillet at the area where the release draft has been formed when the formed release draft is sufficient for releasing the product from the mold. With this, the engineer can do the work while confirming or verifying the function of the product based on the product model with the fillet applied and in addition, the operation is relatively easy when the applied release draft is to be changed for some reason.

In the system, the release draft forming means determines the area and the surface as a reference draft surface, and forms the release draft based on the reference draft surface. With this, in addition to the advantages mentioned above, it becomes possible to form the draft surface that is tangentially continuous with the area and the filleted surface automatically. Moreover, the freedom of design can be improved.

In the system, the release draft forming means determines at least one of the area and the surface as a reference draft surface, and forms the release draft based on the reference draft surface. With this, in addition to the advantages mentioned above, it becomes possible to form the draft surface that is tangentially continuous with the area or the filleted surface automatically. Moreover, the freedom of design can be improved.

In the system, the fillet has a definite radius of curvature, or the fillet has an indefinite radius of curvature. With this, in addition to the advantages mentioned above, the freedom of design can be improved.

It should be noted in the above that although this computer-aided product design system in the embodiments has been described on a basic element with a single number of the fillet, the release draft, etc., needless to say, it can be applied to a basic element with a plurality of fillets, the release drafts, etc.

The entire disclosure of Japanese Patent Application No. 2001-086,221 filed on Mar. 23, 2001, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A system for designing a product having at least a computer, a display connected to the computer for displaying result of processing of the computer, an input device connected to the computer for allowing an engineer to enter data in accordance with a required specification of the product and an interactive program, stored in the computer, for aiding the engineer to design the product through the display and the input device, the program having a shape modelling function realized by 3-dimensional curves and surfaces and including at least:
   product design process for allowing the engineer to design a product model by modelling the product through the shape modelling function; and
   mold design process for allowing the engineer to design a mold for producing the product based on the designed product model;
   wherein the program of the product design process comprising;
   basic element constructing means for constructing a basic element that constitutes the product model;
   fillet applying means for applying a fillet on the constructed basic element; and
   release draft judging means for judging whether a release draft formed on the constructed basic element with the applied fillet is sufficient for releasing the product from the mold to be designed on the mold design process,
   wherein the release draft judging means includes;
   release draft forming means for forming the release draft on the constructed basic element, and
   wherein the release draft forming means removes the fillet while the release draft is being formed, and restores the fillet after the release draft has been formed.

2. A system according to claim 1, wherein the release draft forming means designates an area of the constructed basic element by a parting plane of the mold and a direction of release of the product from the mold, and forms the release draft at the designated area.

3. A system according to claim 2, wherein the release draft forming means forms the release draft in an area other than a surface where the fillet is applied, and reapplies the fillet at the area where the release draft has been formed when the formed release draft is sufficient for releasing the product from the mold, whereby the fillet blends into the formed release draft.

4. A system according to claim 2, wherein the release draft forming means determines a reference draft surface, and forms the release draft based on the reference draft surface.

5. A system according to claim 3, wherein the release draft forming means determines a reference draft surface, and forms the release draft based on the reference draft surface.

6. A system according to claim 1, wherein the fillet has a definite radius of curvature.

7. A system according to claim 1, wherein the fillet has an indefinite radius of curvature.

8. A method of designing a product having at least a computer, a display connected to the computer for displaying result of processing of the computer, an input device connected to the computer for allowing an engineer to enter data in accordance with a required specification of the product and an interactive program, stored in the computer, for aiding the engineer to design the product through the display and the input device, the program having a shape modelling function realized by 3-dimensional curves and surfaces and including at least:

product design process for allowing the engineer to design a product model by modelling the product through the shape modelling function; and mold design process for allowing the engineer to design a mold for producing the product based on the designed product model;

wherein the program of the product design process comprising the steps of;

(a) constructing a basic element that constitutes the product model;

(b) applying a fillet on the constructed basic element; and (c) judging whether a release draft formed on the constructed basic element with the applied fillet is sufficient for releasing the product from the mold to be designed on the mold design process, wherein the step of release draft judging includes the step of;

(d) forming the release draft on the constructed basic element, and wherein the step of release draft forming removes the fillet while the release draft is being formed, and restores the fillet after the release draft has been formed.

9. A method according to claim 8, wherein the step of release draft forming designates an area of the constructed basic element by a parting plane of the mold and a direction of release of the product from the mold, and forms the release draft at the designated area.

10. A method according to claim 9, wherein the step of release draft forming forms the release draft in an area other than a surface where the fillet is applied, and reapplies the fillet at the area where the release draft has been formed when the formed release draft is sufficient for releasing the product from the mold, whereby the fillet blends into the formed release draft.

11. A method according to claim 9, wherein the step of release draft forming determines a reference draft surface, and forms the release draft based on the reference draft surface.

12. A method according to claim 10, wherein the step of release draft forming determines a reference draft surface, and forms the release draft based on the reference draft surface.

13. A method according to claim 8, wherein the fillet has a definite radius of curvature.

14. A method according to claim 8, wherein the fillet has an indefinite radius of curvature.

* * * * *